Feb. 11, 1930.                F. C. THOMSON                1,746,876
                OPPOSED PISTON INTERNAL COMBUSTION ENGINE
                   Filed Jan. 28, 1929        3 Sheets-Sheet 1
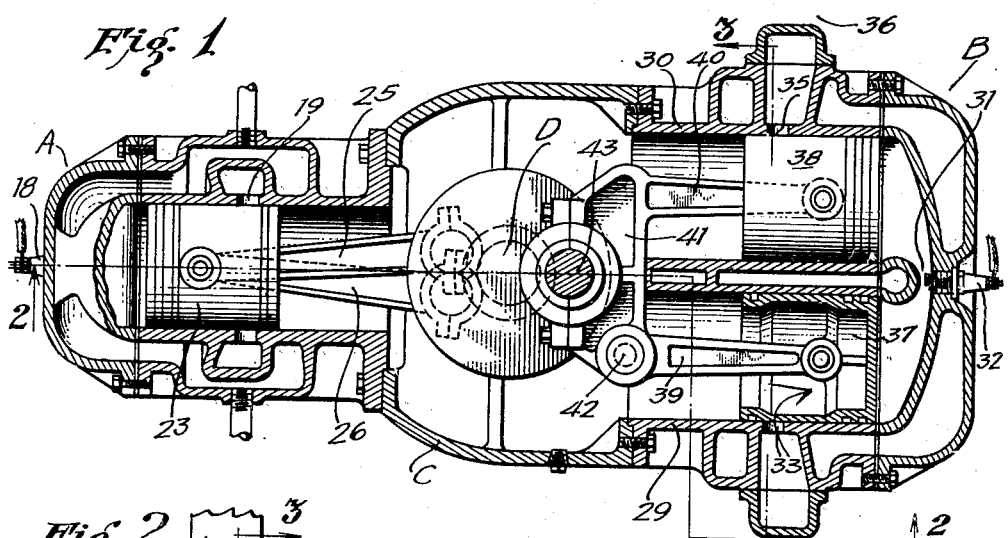
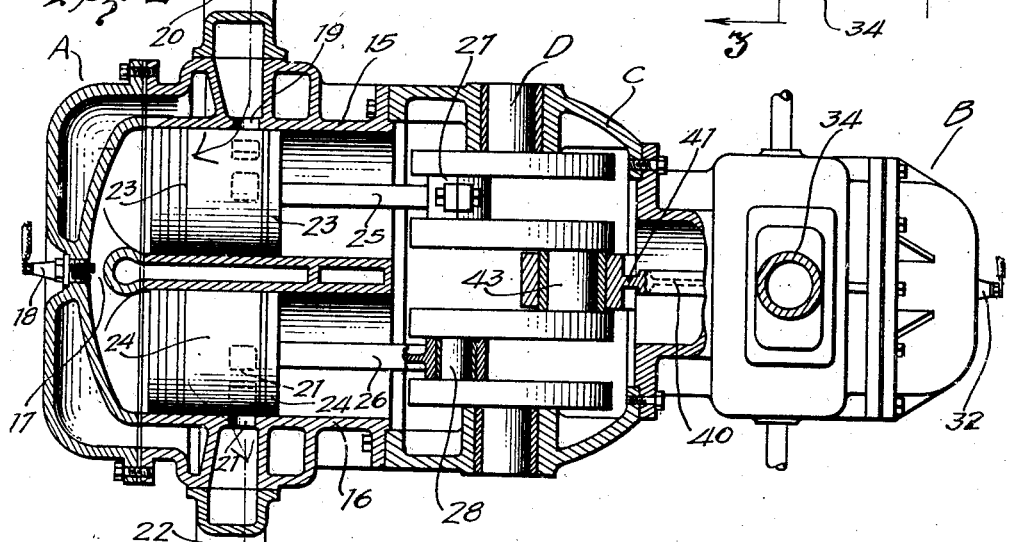
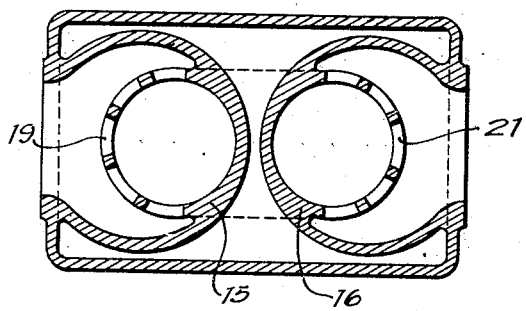
INVENTOR.
Fred C. Thomson, deceased.
David R. Faries, Special Administrator.
BY
ATTORNEYS Feb. 11, 1930.   F. C. THOMSON   1,746,876
OPPOSED PISTON INTERNAL COMBUSTION ENGINE
Filed Jan. 28, 1929   3 Sheets-Sheet 2
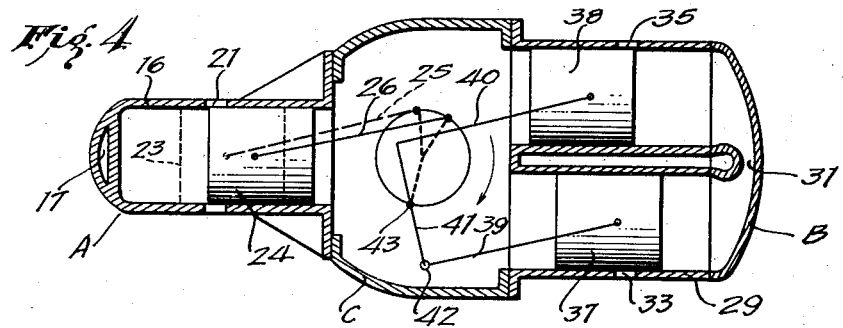
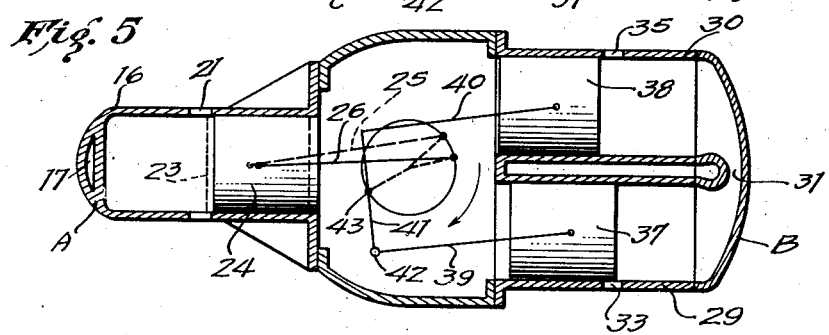
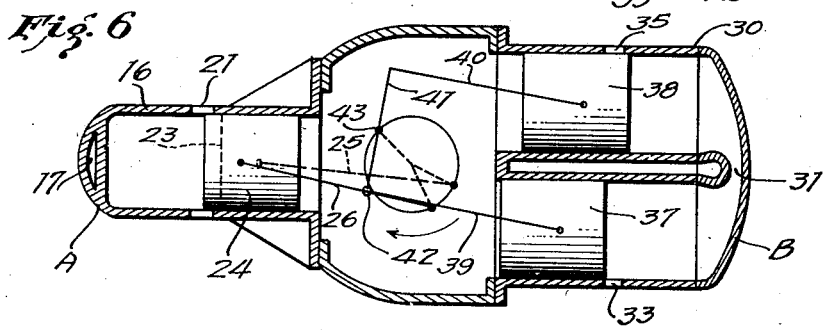
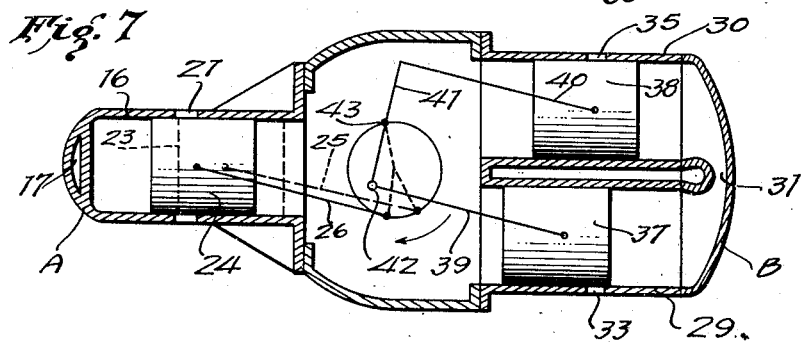
INVENTOR.
Fred C. Thomson, deceased.
David R. Faries, Special Administrator.
BY Nestall and Wallace
ATTORNEYS

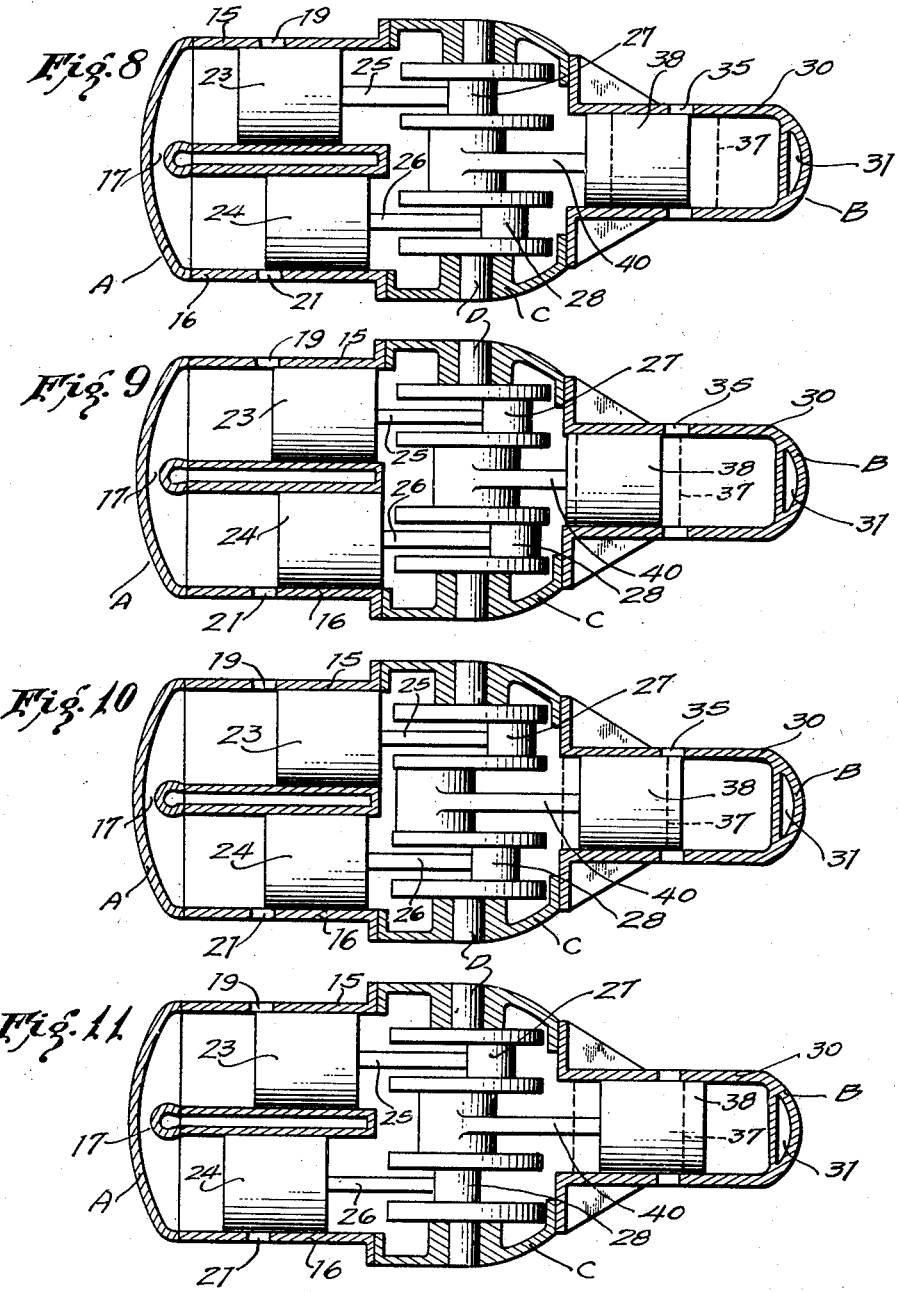

Patented Feb. 11, 1930

1,746,876

UNITED STATES PATENT OFFICE

FRED C. THOMSON, DECEASED, LATE OF BEVERLY HILLS, CALIFORNIA, BY DAVID R. FARIES, ADMINISTRATOR, OF LOS ANGELES, CALIFORNIA

OPPOSED-PISTON INTERNAL-COMBUSTION ENGINE

Application filed January 28, 1929. Serial No. 335,667.

This invention relates to an opposed piston internal combustion engine wherein the thrust upon a crank shaft from opposed pistons is centrally balanced and oppositely directed. The present invention is especially applicable to two units, each unit comprising paired cylinders, the units, being opposed and connected to a single crank shaft. Herein, the expression "paired cylinder units" is used to means a pair of cylinders arranged side by side with their combustion ends connected. Various attempts have been made to balance the thrust of multiple cylinder engines upon a crank shaft by opposing certain of the piston thrusts. An equal thrust should be exerted substantially simultaneously from opposite sides and the load should be applied to the crank shaft at points so distributed both as to location and force exerted as to balance one another. Considering the crank shaft as a beam, if the cylinders are placed so as to extend along the shaft, the thrust exerted by individual cylinders will vary because of the difference in operation of the engine units even though designed to produce the same thrust. Heretofore, in opposed pistons the use of more than two cylinders has resulted in unequal thrust and whipping of the shaft. The present invention contemplates the use of groups of cylinders arranged in pairs, the members of each pair inherently substantially balancing one another in thrust.

The objects of this invention are first, to provide a paired cylinder opposed piston engine having groups of cylinders, each group arranged with the pistons of one pair balancing in thrust upon the crank shaft and opposing in thrust the pistons of another pair; and second, to provide a novel compact arrangement of the cylinders and associated parts.

These objects are obtained by means of the embodiment of my invention, illustrated in the accompanying drawings, in which:—

Fig. 1 is a central vertical section through an engine constructed in accordance with my invention; Fig. 2 is a horizontal section partly in elevation as seen on the line 2—2 of Fig. 1; Fig. 3 is a section as seen on the line 3—3 of Fig. 1; Figs. 4 to 7 are diagraphic views illustrating the positions of one pair of cylinders for various events in their cycles; and Figs. 9 to 11 are diagraphic views corresponding to Figs. 4 to 7 taken at right angles thereto.

Referring with more particularity to the drawings and especially to Figs. 1, 2 and 3, one pair of cylinders is indicated by A and the other pair by B. Between the pairs A and B is a common crank case C in which is journalled a common crank shaft D. It will be noted that the plane passing through the axes of the members of pair A is at right angles to the plane passing through the axes of the members of pair B. Considering pair A, it comprises cylinders 15 and 16 arranged side by side. The combustion ends of the cylinders 15 and 16 communicate with one another through a port 17. This port is of constricted cross-sectional area for a purpose not pertinent to the present invention. A single spark plug 18 may be employed for both cylinders of the pair as they operate in unison. A suitable water jacket is shown provided for the cylinders. Cylinder 15 constitutes an intake cylinder having intake ports 19 communicating with an intake chamber to which a fuel charge is supplied from the intake pipe 20. Cylinder 16 constitutes an exhaust cylinder having exhaust ports 21 communicating with an exhaust chamber from which leads an exhaust pipe 22. The intake and exhaust ports are controlled by pistons 23 and 24 reciprocating in the cylinders 15 and 16 respectively. The pistons 23 and 24 are provided with connecting rods 25 and 26 respectively and are connected to crank pins 27 and 28 formed on the crank shaft D. They are equally spaced from the crank shaft bearings and at a slight difference of angle for a purpose later described. Traverse of the ports by the pistons controls the intake and exhaust of the cylinders.

Pair B has the cylinders 29 and 30 of substantially the same bore as cylinders 15 and 16. Their combustion ends communicate through a port 31 of restricted cross-sectional area and a single spark plug 32 may serve for ignition. The cylinders are shown water jacketed. About the cylinder 29 is an intake chamber having intake ports 33 intermediate its ends communicating with an intake pipe 34. The cylinder 30 has intermediate its ends an exhaust chamber communicating with the cylinder through exhaust ports 35. An exhaust pipe is indicated by 36. The intake and exhaust ports are controlled by pistons 37 and 38 respectively. Piston 37 controls the intake ports 33 and piston 38 controls the exhaust ports 35. Secured to piston 37 is a connecting rod 39, and secured to piston 38 is a connecting rod 40 having fixed thereto a rocker 41. The outer end of connecting rod 39 is pivotally secured to the rocker at 42. The rocker is journalled intermediate its ends upon crank pin 43 disposed between pins 27 and 28.

The operation of the pair B of cylinders is illustrated in the Figs. 4 to 7. It will be noticed that upon both the out and in strokes, piston 38 leads piston 37. In Fig. 4, the pistons are shown travelling on their out strokes with piston 38 about to uncover exhaust port 35. The pistons are shown in Fig. 5 approaching the ends of their out or working strokes, piston 37 beginning to uncover the intake port 33. Thereafter, there will be a scavenging of the cylinders. It will be noticed that piston 37 has a very appreciable distance to travel after the opening of the exhaust port 35 by piston 38 before piston 37 fully uncovers the intake ports 33. After the crank has reached its outer dead center, pistons 37 and 38 are in such positions that both the intake and exhaust ports will have been uncovered as shown in Fig. 1. As soon as the intake port has been opened, the incoming charge of gas begins to enter the cylinder 29, forcing the spent gases before it through the communication port 31 and through cylinder 30 to the exhaust port 35 and then out of the cylinder. The piston 37 continues to move outwardly while the piston 38 starts inwardly to close the exhaust port 35. In Fig. 6, the piston 38 is shown in position fully covering the exhaust ports 35, piston 37 still being in position uncovering the intake port 33. Closure of the exhaust port prevents further flow of gas from the cylinder 30 and the pressure of the incoming fresh charge may be built up until the final closure of the intake opening. The compression stroke now starts by reason of the piston 37 in its travel following piston 38 and closing the intake port 33 as shown in Fig. 7. Both pistons travel to the inner ends of their strokes compressing the charge so that it is ready for firing. The out or working stroke then begins with piston 38 leading piston 37 and the cycle is repeated.

It will be noted that the thrusts of pistons 37 and 38 are collectively transmitted to the center of the crank pin and concentrated at the mid-point. The combined thrusts at the mid-point is opposite to the thrusts of the pistons of pair B. The result is a balanced thrust upon the crank shaft.

The operation of pair A is different, in that, in order to cause a lead in the closure of the exhaust port 21 as compared with intake port 19, the exhaust piston is advanced. This is accomplished by a lead in the angle of its crank pin 28. However, the opening of the exhaust is correspondingly advanced. The relation of the exhaust and inlet events permits supercharging. It will be understood however that this relation is not essential to the inventive idea.

The thrusts of pistons 23 and 24 is transmitted to the crank shaft at equally spaced distances from the combined thrust of pair B and in opposition to the latter. The cylinders being paired results in a substantially equal thrust by each member.

What is claimed is:—

1. An engine comprising opposed pairs of cylinders having pistons and piston rods, the cylinders of each pair being disposed side by side, the plane passing through the axes of one pair of cylinders being at an angle to the plane passing through the axes of the other pair of cylinders, a common crank shaft, the piston rods of one pair having spaced connections to said crank shaft, a rocker connecting the piston rods of the members of the other pair, said rocker being connected intermediate said spaced connections to said crank shaft.

2. An engine comprising opposed pairs of cylinders having pistons and piston rods, the cylinders of each pair being disposed side by side, the plane passing through the axes of one pair of cylinders being normal to the plane passing through the axes of the other pair of cylinders, a common crank shaft disposed intermediate said cylinders, the piston rods of one pair having spaced connections to said crank shaft, a rocker connecting the piston rods of the members of the other pair, said rocker being connected intermediate said spaced connections to said crank shaft.

3. An engine comprising opposed pairs of cylinders having pistons and piston rods, the cylinders of each pair being disposed side by side and having their combustion spaces communicating, the plane passing through the axes of one pair of cylinders being at an angle to the plane passing through the axes of the other pair of cylinders, a common crank shaft, the piston rods of one pair having spaced connections to said crank shaft, a rocker connecting the piston rods of the members of the other pair, said rocker being connected intermediate said spaced connections to said crank shaft.

4. An engine comprising opposed pairs of cylinders having pistons and piston rods, the cylinders of each pair being disposed side by side and having their combustion spaces communicating, the plane passing through the axes of one pair of cylinders being normal to the plane passing through the axes of the other pair of cylinders, a common crank shaft disposed intermediate said cylinders, the piston rods of one pair having spaced connections to said crank shaft, a rocker connecting the piston rods of the members of the other pair, said rocker being connected intermediate said spaced connections to said crank shaft.

5. An engine comprising two opposed engine units, each unit comprising a pair of cylinders having a piston and piston rod, the cylinders of each pair being disposed side by side, the plane passing through the axes of one pair of cylinders being at an angle to the plane passing through the axes of the other pair of cylinders, a common crank shaft, the piston rods of one pair having spaced connections to said crank shaft, a rocker connecting the piston rods of the members of the other pair, said rocker being connected intermediate said spaced connections to said crank shaft.

6. An engine comprising two opposed engine units, each unit comprising a pair of cylinders having a piston and piston rod, the cylinders of each pair being disposed side by side, the plane passing through the axes of one pair of cylinders being normal to the plane passing through the axes of the other pair of cylinders, a common crank shaft disposed intermediate said cylinders, the piston rods of one pair having spaced connections to said crank shaft, a rocker connecting the piston rods of the members of the other pair, said rocker being connected intermediate said spaced connections to said crank shaft.

In witness whereof I have hereunto subscribed my name this 9th day of January, 1929.

DAVID R. FARIES,
*Special Administrator of Fred C. Thomson, Deceased.*